US009031285B2

(12) United States Patent
Nguyen et al.

(10) Patent No.: US 9,031,285 B2
(45) Date of Patent: May 12, 2015

(54) DETECTION OF FLOATING OBJECTS IN MARITIME VIDEO USING A MOBILE CAMERA

(71) Applicant: UtopiaCompression Corporation, Los Angeles, CA (US)

(72) Inventors: Hieu Tat Nguyen, Cypress, CA (US); Prakash Ramu, Sunnyvale, CA (US); Hai Wei, Los Angeles, CA (US); Xiaoqing Liu, El Cerrito, CA (US); Jacob Yadegar, Santa Monica, CA (US)

(73) Assignee: UtopiaCompression Corporation, Los Angeles, CA (US)

( * ) Notice: Subject to any disclaimer, the term of this patent is extended or adjusted under 35 U.S.C. 154(b) by 102 days.

(21) Appl. No.: 13/864,551

(22) Filed: Apr. 17, 2013

(65) Prior Publication Data
US 2014/0314270 A1    Oct. 23, 2014

(51) Int. Cl.
*G06K 9/00*    (2006.01)
*H04N 9/083*    (2006.01)

(52) U.S. Cl.
CPC ............................ *G06K 9/0063* (2013.01)

(58) Field of Classification Search
USPC ......... 382/100, 103, 106–107, 155, 162, 164, 382/168, 173, 181, 199, 203, 209, 219, 224, 382/232, 243, 254, 274, 276, 287–295, 305, 382/312; 342/52; 348/270
See application file for complete search history.

(56) References Cited

U.S. PATENT DOCUMENTS

| | | | |
|---|---|---|---|
| 7,660,439 B1 * | 2/2010 | Lu et al. | 382/107 |
| 7,822,275 B2 * | 10/2010 | Rasheed et al. | 382/173 |
| 8,659,686 B1 * | 2/2014 | Clark | 348/270 |
| 2004/0056792 A1 * | 3/2004 | Miron | 342/52 |
| 2013/0156305 A1 * | 6/2013 | Prasad et al. | 382/164 |

OTHER PUBLICATIONS

Nguyen, H.W.; Ramu, P.; Raju, C.; Liu, X.; Yadegar, J., "Automated Intelligent Video Surveillance System for Ships", Proceedings of SPIE vol. 7306, 73061N—Published: May 5, 2009, SPIE Digital Library.*

* cited by examiner

*Primary Examiner* — Seyed Azarian
(74) *Attorney, Agent, or Firm* — Barlow, Josephs & Holmes, Ltd.

(57) ABSTRACT

A method and system for detecting floating objects in maritime video is disclosed. The horizon is detected within the video. Modeling of the sky and water is performed on the video. Objects are detected that are not water and sky within the video.

20 Claims, 6 Drawing Sheets
(6 of 6 Drawing Sheet(s) Filed in Color)

DETECTION OF FLOATING OBJECTS IN MARITIME VIDEO USING A MOBILE CAMERA

This invention was made with government support under Contract No. N65538-06-M-0034 awarded by U.S. Navy SBIR Phase 1 and Phase II programs. The government has certain rights in the invention.

BACKGROUND OF THE INVENTION

1. Field of the Invention

The present patent document relates generally to automated identification of objects and more specifically to a method and system of detecting floating objects in maritime video using a mobile camera.

2. Background of the Related Art

To protect naval and commercial ships from attack by terrorists and pirates, it is critical to have automatic surveillance systems able to detect, identify, track and alert the crew regarding small watercraft that might have malicious intentions, while ruling out non-threat entities. Unfortunately, radar systems, which are widely deployed on board military and commercial ships, have limitations on the minimum detectable range, lack of sensitivity to small non-metallic targets, and limited classification ability. Such deficiencies can be mitigated by a real-time video surveillance system.

While there is abundance of intelligent video surveillance systems for ground and aerial environments, very few have been developed for maritime video surveillance especially in case of mobile sensor platforms. A significant technical challenge in maritime surveillance is the automatic detection of potential targets of interest (such as boats, rafts, buoys, swimmers) and their discrimination from irrelevant scene elements (waves, sky, land and objects thereon) under a moving camera. Computer vision has been successful in detection of moving objects in video using the background subtraction which requires the camera to be stationary. When the camera is moving, the conventional approach to target detection is to compensate the camera motion and extract foreground objects that have different motion.

In maritime scenarios, however, the background motion estimation is very unreliable either due to the lack of textures in water and sky regions or, in case of textured scenes, due to the non-rigidity and rapid appearance changes of waves. Moreover, the motion compensation approach does not detect stationary targets. The limited number of existing solutions for maritime target detection rely on some kind of high-pass filter to detect small and dim blobs in an image. However, the locality of this approach leads to numerous drawbacks including the limitation in detection of larger targets, the sensitivity to waves, sun glints or water droplets on the camera lens, the presence of land and objects thereon. There is no reliable method for detection of targets in maritime environments in the prior art. Accordingly, there is a need for better target acquisition in maritime environments.

SUMMARY OF THE INVENTION

The system and method described herein solves the problems of the prior art by providing a system and method that robustly detects floating objects in maritime imagery against waves, land, sky and other irrelevant objects. Based on an innovative approach to maritime scene segmentation and modeling, the invented algorithm is able to detect potential targets of interest in real-time video for both stationary cameras installed at harbors as well as mobile cameras mounted on ships. The system and method further includes robust target detection and has enabled accurate tracking and recognition of objects and their activity, and early detection of potential threats to the maritime facilities under protection.

The system and method described herein robustly segments floating objects from water, sky, land, waves and scene clutter, that provides real-time robust detection of potential targets of interest from maritime EO/IR video feeds, enabling accurate target tracking, recognition, and event analysis and threat detection for video surveillance applications in both stationary and mobile camera platforms.

BRIEF DESCRIPTION OF THE DRAWINGS

The patent or application file contains at least one drawing executed in color. Copies of this patent or patent application publication with color drawing(s) will be provided by the Office upon request and payment of the necessary fee. These and other features, aspects, and advantages of the present invention will become better understood with reference to the following description, appended claims, and accompanying drawings where:

FIG. 3b shows a Canny edge map, created from the original frame of video depicted in FIG. 3a;

FIG. 5c illustrates a water model residue on the original frame of video depicted in FIG. 5a;

DESCRIPTION OF THE PREFERRED EMBODIMENT

Figure 1:
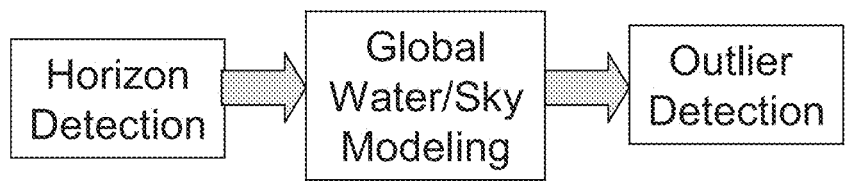
FIG. 1 is a flow chart summarizing the steps of the system and method for detecting floating objects in maritime video.

The method and system of detecting floating objects is described in detail below, with reference to the Figs., the overview of the process generally being shown in FIG. 1. The method and system may be implemented as software running on a general purpose computer, having a memory, processor and storage; a network of computers; or even implemented as firmware on specialized, dedicated hardware. The method and system described herein is optimally part of a surveillance system for ships, which may include a network of remote cameras, facilitating real-time threat detection. The details of such a system may be found in the white paper *Automated Intelligent Video Surveillance System for Ships*, Hai Wei et al. (2009), the entire content of which are incorporated herein by reference.

The method and system includes three processes, where, first, the horizon is detected, then, second, the sky and water are detected, and, thirdly, the objects are detected within the video.

Turning now to the first step, the horizon line is first estimated for a low resolution level by applying the Hough transform to detect the "straightest" line in the Canny edge map. The Canny edge map is a boundary line drawn around the high contrasting objects in the video in a step to ascertain the horizon. This initial estimate is then refined in the high resolution, and if necessary is adjusted through the analysis of the water intensity model.

Figure 2:
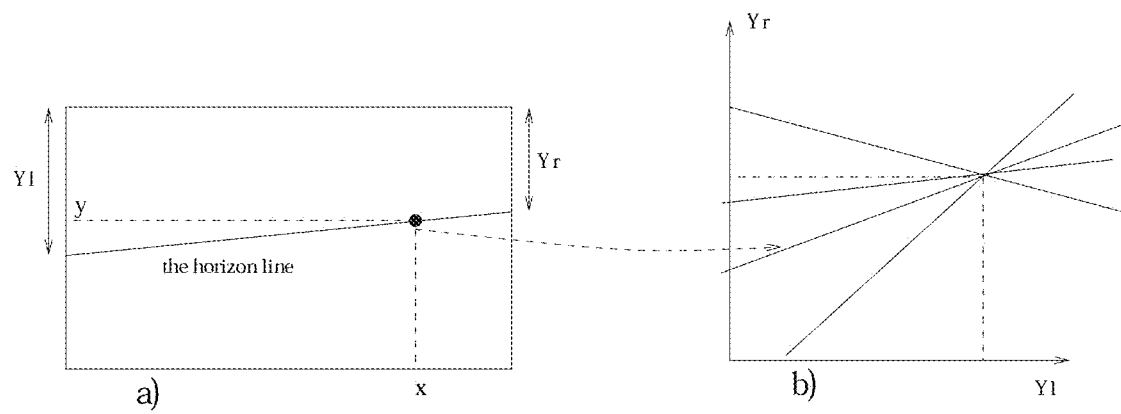
FIG. 2 is two charts, juxtaposed, illustrating the parameterization of the horizon line within the maritime video and the detection of the horizon.

A straight line is parameterized as:

$$y = Y_l - (Y_l - Y_r)\frac{x}{\text{width}}$$

with two parameters $Y_l$ and $Y_r$ being the y-coordinate of the intersections between the line and the left and right borders of the image respectively, see FIG. 2. Every boundary pixel will make a contribution to all points in the corresponding line in the parameter space $(Y_l, Y_r)$:

$$Y_r = Y_l - \frac{\text{width}}{x}(y - Y_l)$$

Figure 3A:
FIG. 3a shows an original frame of video in low resolution.
Figure 3B:
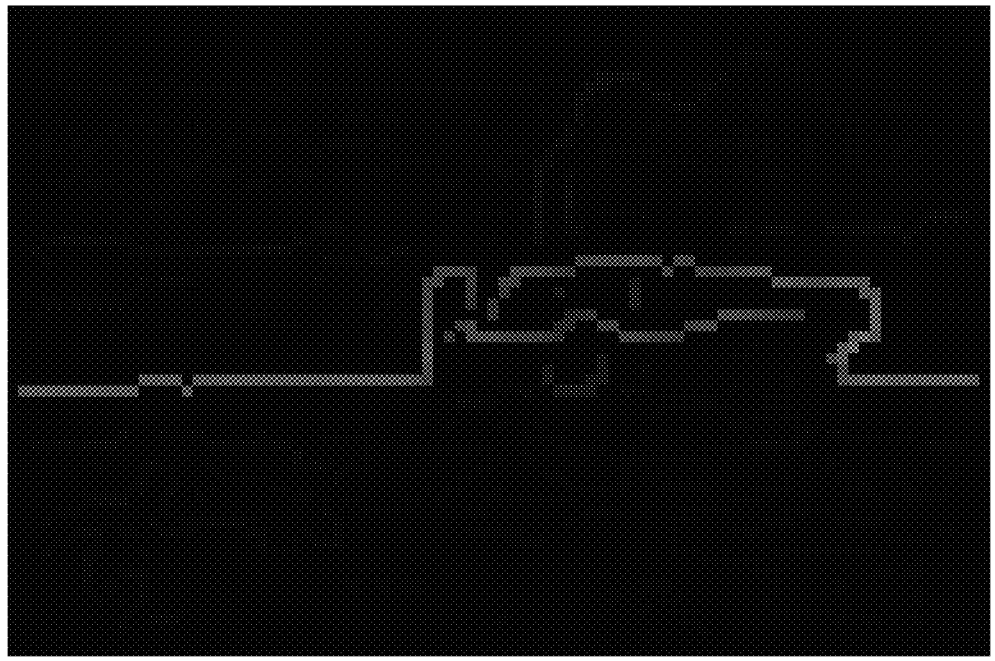
Figure 3C:
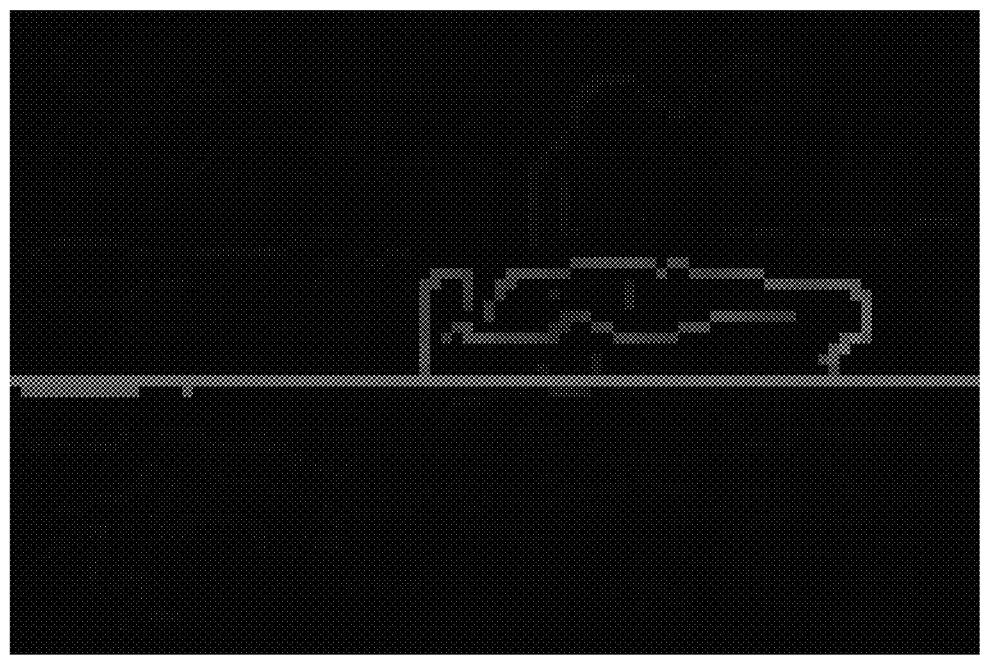
FIG. 3c shows the estimation of the horizon line on the Canny edge map.

$Y_l$ is restricted to be within a certain distance from y, i.e. $Y_l \in [y-c, y+c]$ where c is a constant chosen such that the angle between the horizon line and the true horizontal axis does not exceed a pre-defined limit. After all boundary pixels make their contribution, an image representing the contribution score for each point in the parameter space is obtained. This score is normalized by dividing to the width of the image. The pair $(Y_l, Y_r)$ with the maximal contribution is selected, and the line with these parameters is considered as the horizon line of the scene. An example result of applying these steps is shown sequentially in FIGS. 3a-3c.

Figure 4:
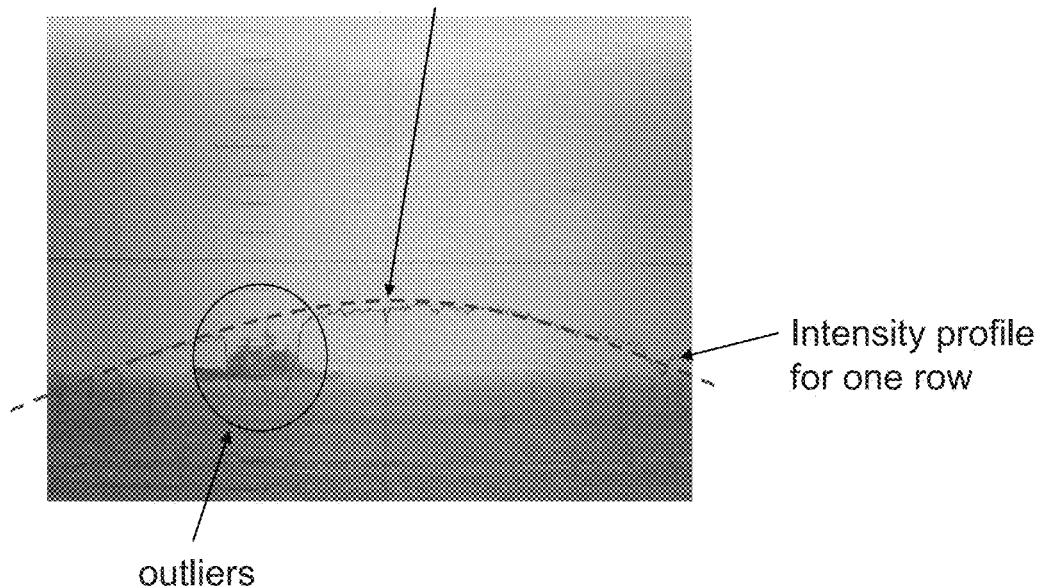
FIG. 4 shows an illustration of a sky/water model and step of outlier detection.

Turning now to the second step, sky pixels have strong correlation in their color, and so are water pixels. Once the horizon is known, the sky color and water color can be modeled, and thereby potential targets and other non-sky and non-water objects can be detected as outliers to the models. The investigation of intensity profile in periscope images showed that quadratic polynomials are a good model for both sky and water pixels, see FIG. 4. Specifically, sky and water pixel intensity are modeled using two separate regressions with respect to pixel coordinates:

$$I_{sky}(x,y) = a_0 x^2 + a_1 xy + a_2 y^2 + a_3 x + a_4 y + a_5$$

$$I_{water}(x,y) = b_0 x^2 + b_1 xy + b_2 y^2 + b_3 x + b_4 y + b_5$$

where $a_0, \ldots, a_5$ are the sky model parameters which are estimated for pixels above the horizon, while $b_0, \ldots, b_5$ are the water model parameters which are estimated using pixels below the horizon.

As pixels in potential targets and/or land regions do not conform to these models, the weighted least squares (WLS) are employed to estimate the parameters robustly against the presence of those non-sky and non-water objects. In particular, the water modeling is performed by iteratively minimizing the weighted least squares error function:

$$\min_{b_0,\ldots,b_5} \sum_{(x_i,y_i)\in\Omega} w_i (I(x_i, y_i) - b_0 x_i^2 - b_1 x_i y_i - b_2 y_i^2 - b_3 x - b_4 y - b_5)^2$$

where the summation is taken over $\Omega$ the set of all pixels $(x_i, y_i)$ below the estimated horizon line. Initially the weights $w_i$ are set equal. At the next iterations, $w_i$ are updated as follows:

$$w_i = \begin{cases} (1 - r_i^2)^2; & |r_i| \leq T \\ 0 & |r_i| > T \end{cases}$$

where $r_i$ is the residue at pixel $(x_i, y_i)$, and T is a pre-defined threshold. In this way, the non-water pixels which have a high residue will not contribute to the resulting estimates of the model parameters.

The water/sky model estimation is performed for each color channel, and for each pixel the maximal residue over the three color channels is selected. The resulting residue will be used for land and target segmentation.

Figure 5A:
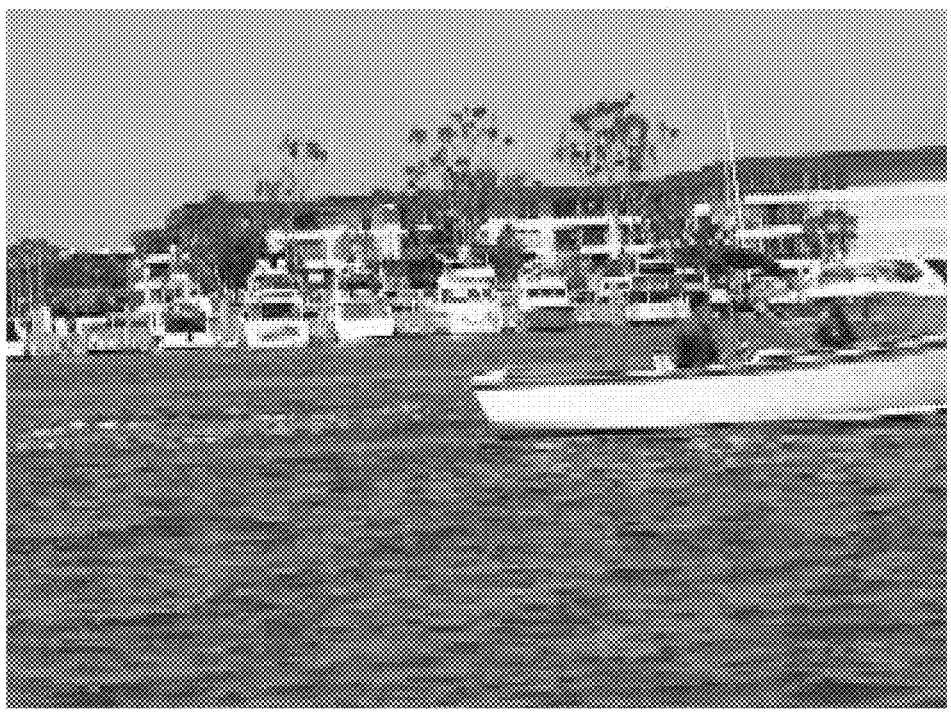
FIG. 5a shows another original frame of video.
Figure 5B:
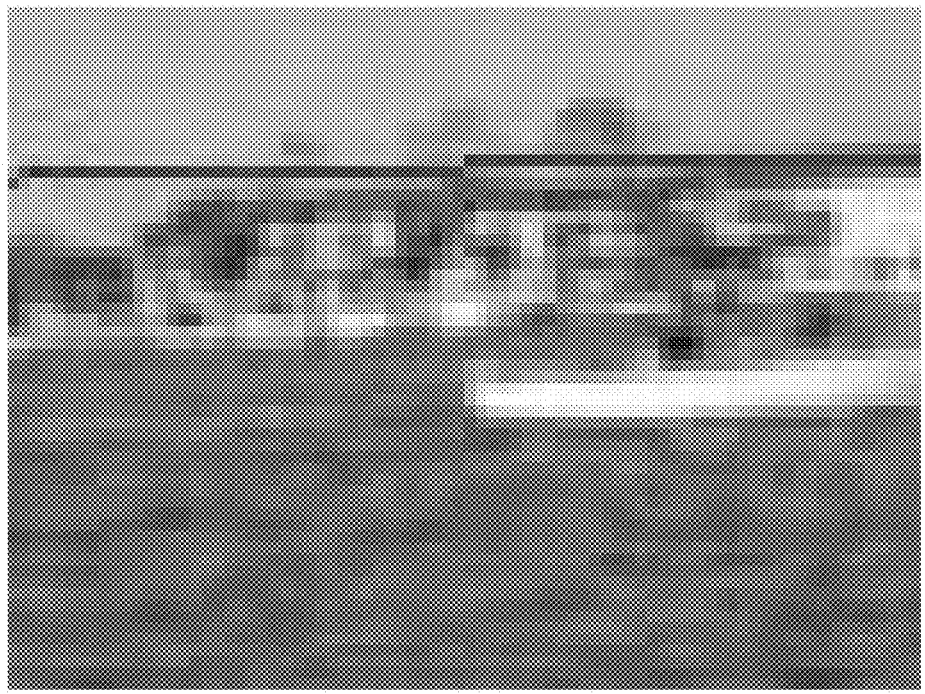
FIG. 5b illustrates an estimated horizon from the other original frame of video in FIG. 5a, the depiction shown in low resolution.
Figure 5C:
Figure 5D:
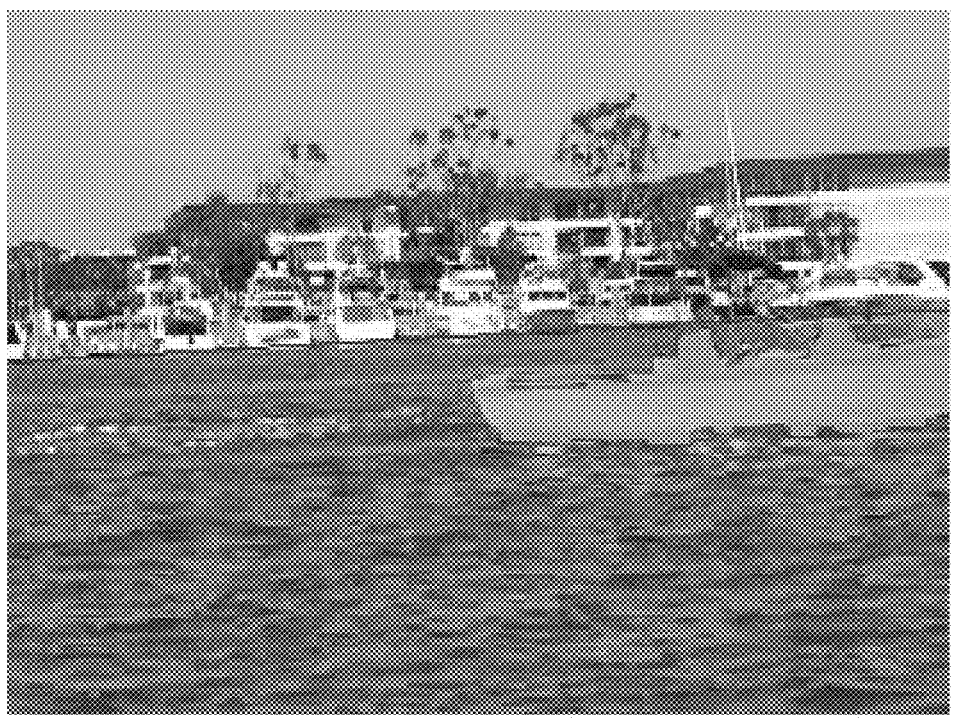
FIG. 5d illustrates a step of correcting the horizon line and identifying objects after the water model residue step shown in FIG. 5b.

The initial estimation of the horizon line provides accurate results in many maritime scenarios especially when the scene contains only water, sky and surface objects. However, in scenarios where there is a land strip at the horizon, the Hough transform may return a line separating the land from the sky. In this situation, the correct horizon line can still be determined through the analysis of the residue of the water model. As shown in FIG. 5c, the land strip has significantly higher residues than water pixels. The residue image is smoothed and thresholded, resulting in a binary segmentation of the image into water and non-water regions where the later include land, sky and surface objects. The Hough transform is re-applied to the boundaries between these two regions to obtain a more accurate estimate of the horizon line. (See FIG. 5d).

Turning now to the third step, potential targets and land regions are detected from outliers, i.e. pixels that have high residue to the water and sky models. At the full resolution, however, the residual image is usually noisy as it includes sea clutters. Under a horizontal viewing angle, the clutter size is larger for pixels close to the camera. To eliminate sea clutters from the residue image, a morphological open-close smoothing filter with a square structuring element B of variable size is applied. Specifically, the size of B increases from O for pixels at the horizon and to a maximum size $r_{max}$ for pixels at the bottom of the image. Let r(x,y) be the size of B at pixel (x,y). Then:

$$r(x, y) = r_{max} \frac{y - y_h(x)}{\text{height} - y_h(x)}$$

where $y_h(x)$ is the y-coordinate of the point on the horizon, which have the same x-coordinate, and height is the image height. This smoothing approach is effective to removes waves in many choppy seas.

Sky and non-sky objects are detected in a similar manner. However, for the smoothing of the sky residues, a fixed size structuring element for all pixels is used.

Figure 6A:
FIG. 6a is an illustration of a combined residue map of the sky/water model next
Figure 6B:
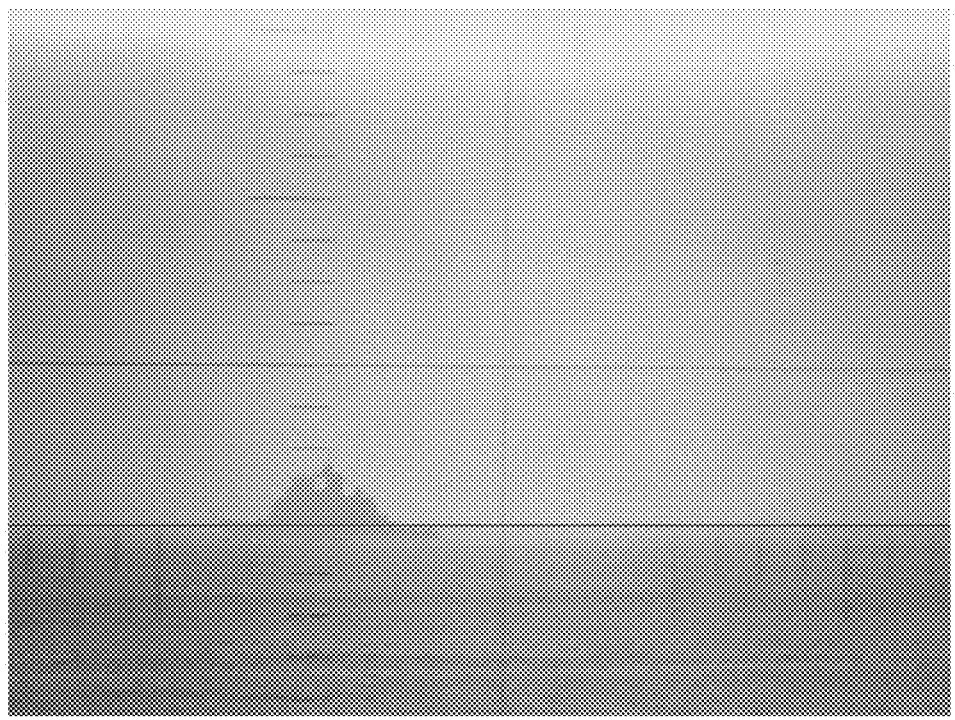
FIG. 6b is an illustration of target detection using hysteresis thresholding.

The sky residues for pixels above horizon and the water residue for pixels below horizon are fused into one residual image as shown in FIG. 6a. Potential foreground targets are then segmented using the hysteresis thresholding, are shown in FIG. 6b.

Figure 7:
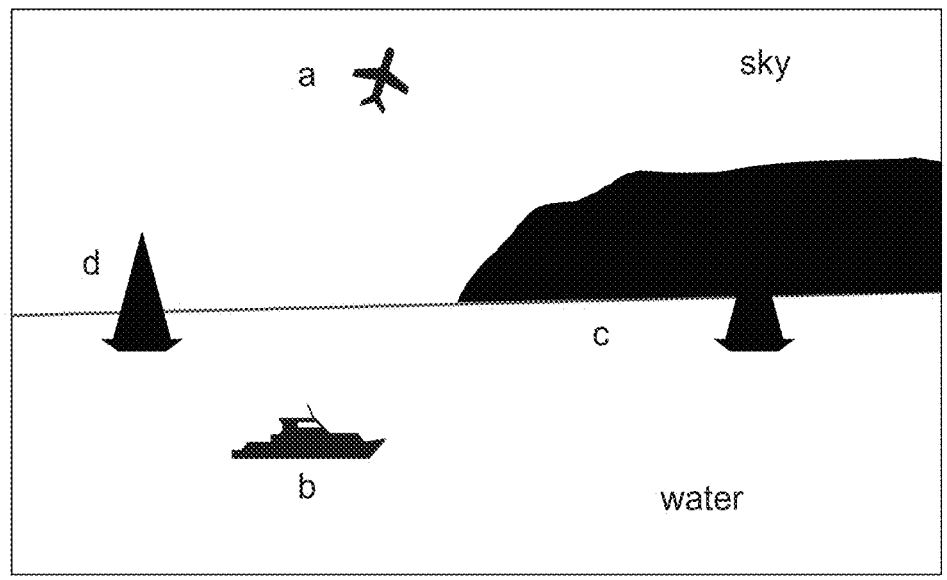
FIG. 7 illustrates possible configuration for connected regions left after water and sky are removed from a frame of video.

The foreground map generated as above in some scenarios may include also airplanes or the land strip which is not a target of interest. Thus for each connected region in the foreground map, the following rules are applied to determine whether it is a target of interest:

First, if the region is completely surrounded by sky, mark it as flying targets (air planes, bird etc.). (See FIG. 7 at a).

Second, if the region is surrounded by water, mark it as maritime targets. (See FIG. 7 at b).

Third, regions left after steps 1 and 2 will lie across the horizon line. A heuristic rule is utilized to determine if the region is a land strip. A region is declared as a land strip if a significant portion of it is above the horizon line and the region is connected to one of the left and right borders of the image. If the region is found to be a land strip, only part that is above the horizon is marked as land. Parts that are below the horizon are separated and marked as maritime targets. (See FIG. 7 at c).

Fourth, regions left after steps described in paragraphs [36], [37, [38] are marked as maritime targets. (See FIG. 7 at d).

The method and system of object detection described herein can be used for video surveillance for both port security and ship/vessel security and protection applications. It is applicable to both electro-optical (EO) and infrared (IR) video data stream for ship/vessel security and protection applications. As a vision-based solution, the developed technology can be used to protect naval and commercial ships from attack by terrorists and pirates. It can be used to complement the existing radar system and provide highly accurate target detection, tracking, classification, real-time threat detection and alerting functionalities. It can also be deployed as a standalone system serving as a complete video-based surveillance solution.

Therefore, it can be seen that the present invention provides a unique solution to the detecting floating objects in maritime video using one or more mobile cameras.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. In a camera system, a method of detecting objects in a maritime video stream comprising the steps of:
   acquiring with a video camera, a maritime video stream;
   providing said maritime video stream to a central processing unit that is integrated with said video camera, said central processing unit running a software application which is operative for
   receiving said maritime video stream,
   detecting a horizon within said maritime video stream to distinguish a water region from a sky region;
   modeling the water region and the sky region within the maritime video, wherein modeling of the sky region and the water region uses two separate regressions, and
   detecting objects that are not water and not sky within the maritime video stream.

2. The method of claim 1, wherein the step of detecting the horizon is performed prior to the step of modeling the water region and the sky region.

3. The method of claim 1, further comprising segmenting the maritime video stream into a water region, a sky region and a land region.

4. The method of claim 1, wherein the step of modeling the water region and the sky region, comprises performing a global regression of spatial image coordinates.

5. The method of claim 4, wherein the step of modeling the water region and the sky region is based on weighted least squares.

6. The method of claim 4, wherein the step of performing a global regression is completed using an estimation method.

7. The method of claim 6 wherein said estimation method is a weighted least squares method.

8. The method of claim 1, further comprising correcting the horizon based on the modeling of the water region and the sky region.

9. The method of claim 1, wherein the step of detecting objects comprises identifying an object as a flying target if it is surrounded by sky.

10. The method of claim 1, wherein the step of detecting objects comprises identifying an object as a maritime target if it is surrounded by water.

11. The method of claim 1, wherein modeling the sky region and the water region is performed for each color channel.

12. The method of claim 1, wherein the modeling of the sky and water regions further comprises determining residue for each pixel within the maritime video stream and whether the residue of the pixel exceeds a predetermined threshold.

13. The method of claim 12, further comprising segmenting the pixel where the residue of the pixel exceeds the predetermined threshold as land and object regions.

14. The method of claim 1, further comprising analyzing the residue of the water model to correct the horizon.

15. The method of claim 1, further comprising filtering the water and sky models.

16. The method of claim 15, wherein filtering the water and sky models is accomplished by applying an open-close smoothing filter to the water and sky models.

17. In a camera system, a method of detecting objects in a maritime video stream comprising the steps of:
acquiring with a video camera, a maritime video stream;
providing said maritime video stream to a central processing unit that is integrated with said video camera, said central processing unit running a software application which is operative for
receiving said maritime video stream,
detecting a horizon within said maritime video stream to distinguish a water region from a sky region;
modeling the water region and the sky region within the maritime video; and
detecting objects that are not water and not sky within the maritime video stream,
wherein the step of detecting objects comprises marking a region as a land area if a significant portion of said region is above the horizon and the region is connected to a left edge or a right edge of the video.

18. The method of claim 17, wherein the step of detecting objects comprises, marking portions of the land region that are above the horizon as land and marking portions of the land region that are below the horizon as maritime targets.

19. In a camera system, a method of detecting objects in a maritime video stream comprising the steps of:
acquiring with a video camera, a maritime video stream;
providing said maritime video stream to a central processing unit that is integrated with said video camera, said central processing unit running a software application which is operative for
receiving said maritime video stream,
detecting a horizon within the maritime video stream to distinguish a water region from a sky region,
modeling the water region and the sky region wherein the step of modeling comprises performing a global regression of spatial image coordinates based on a weighted least squares method, and further wherein modeling of the sky region and the water region uses two separate regressions, and
detecting objects that are not water and not sky within said maritime video stream, wherein the step of detecting objects further comprises segmenting potential foreground objects using hysteresis thresholding.

20. In a camera system, a method of detecting objects in a maritime video stream comprising the steps of:
acquiring with a video camera, a maritime video stream,
providing said maritime video stream to a central processing unit that is integrated with said video camera, said central processing unit running a software application which is operative for
receiving said maritime video stream,
detecting a horizon within the maritime video stream to distinguish a water region from a sky region,
modeling the water region and the sky region wherein the step of modeling comprises performing a global regression of spatial image coordinates using an estimation method, and further wherein modeling of the sky region and the water region uses two separate regressions, and
detecting objects that are not water and not sky within said maritime video stream, wherein the step of detecting objects further comprises segmenting potential foreground objects using a thresholding method.

* * * * *